Sept. 2, 1952  H. E. HANCOCK  2,609,215
STABILIZER FOR TRACTOR POWER LIFTS
Filed Dec. 28, 1950

Hilmer E. Hancock
INVENTOR.

BY
*Ahmer A. O'Brien*
*and Harvey B. Jackson*
Attorneys

Patented Sept. 2, 1952

2,609,215

UNITED STATES PATENT OFFICE 2,609,215

STABILIZER FOR TRACTOR POWER LIFTS

Hilmer E. Hancock, Dent, Minn.

Application December 28, 1950, Serial No. 203,136

1 Claim. (Cl. 280—33.44)

This invention relates to new and useful improvements in structural refinements in tractor power lifts, particularly power lifts of "Ford," "Ferguson" or "Ford-Ferguson" tractors, and the principal object of the invention is to provide stabilizing means for the power lift which may be conveniently and expeditiously adjusted without employing wrenches or other tools, it being possible to make this adjustment without the operator leaving the tractor seat.

An important feature of the invention resides in the provision of stabilizer means which do not interfere with a so-called "toggle bar" such as is often used with the lift equipment, and which facilitate semi-rigid alignment of the implement behind the tractor by permitting the hitch bar to move laterally in instances where side draft exceeds the forward draft.

Some of the advantages of the invention reside in its simplicity of construction, in its efficient and dependable operation, and in its adaptability to economical manufacture and installation.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
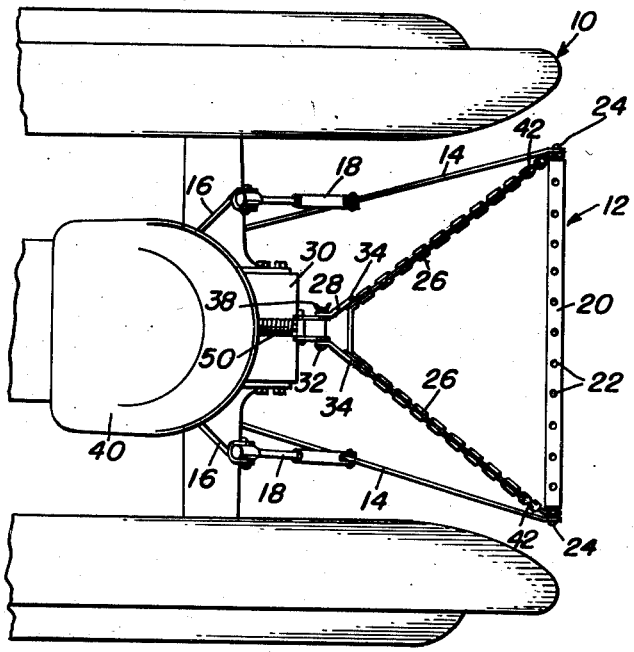
Figure 1 is a fragmentary top plan view of a tractor equipped with the invention.
Figure 2:
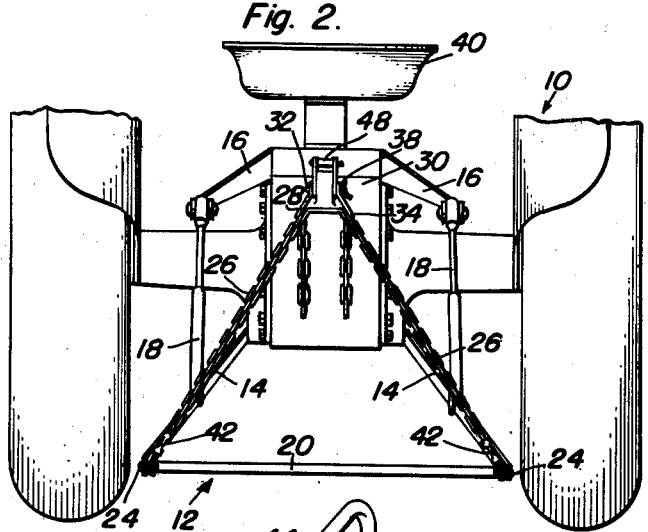
Figure 2 is a fragmentary rear elevational view thereof.
Figure 3:
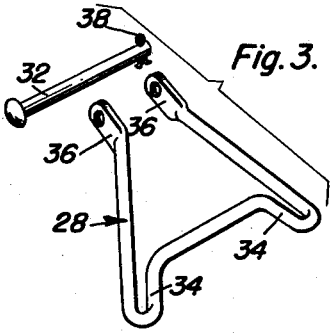
Figure 3 is a group perspective view of a connecting member and pin used in the invention; and, Figure 4 is a perspective view of a turnbuckle coupling used therein.
Figure 4:
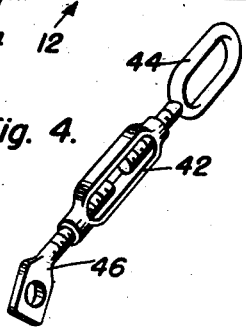

Referring now to the accompanying drawings in detail, the general reference character 10 designates a conventional tractor equipped with a power lift mechanism 12 including a pair of transversely spaced draw-bars 14 which are pivoted to the tractor and extend rearwardly therefrom, being adapted for raising and lowering movement by means of conventional hydraulically actuated cranks 16 connected to the bars 14 by adjustable links 18.

A transversely extending hitch-bar 20, provided with suitable apertures 22 for connecting implements thereto, extends between and is attached to the rear ends of the draw-bars 14 by suitable pivots 24, and the essence of novelty in the invention resides in the provision of flexible stabilizing elements in the form of lengths of chain 26 which extend from the pivots 24 at the opposite ends of the hitch-bar 20 to a connecting member 28 which is pivoted to the rear axle housing 30 of the tractor by a horizontal pin 32.

The connecting member 28 is formed integrally from a one-piece wire rod which has its intermediate portion angulated so as to afford a pair of transversely spaced, substantially U-shaped keeper seats 34 with which the links of the chains 26 may be selectively engaged so as to adjust the length of the chains, as desired. The free end portions of the rod from which the connecting member 28 is formed are flattened so as to provide a pair of apertured ears 36 for mounting upon the pivot pin 32, and a cotter pin 38 is provided in the pivot pin 32 so as to prevent the latter from being withdrawn.

Since the connecting member 28 is located immediately behind the tractor seat 40, the chains 26 in the keeper seats 34 may be conveniently adjusted by the operator of the tractor without the necessity of leaving his seat, but inasmuch as the adjustment facilitated by the links of the chains 26 is relatively coarse, relatively fine adjustment is additionally provided at the points of connection of the chains 26 to the pins 24 at the ends of the hitch-bar 20.

This latter adjustment is achieved by the provision of a pair of turnbuckle couplings 42 which are provided with suitable eyes 44 for connection to the respective chains 26 and are also equipped with apertured ears 46 for connection to the pins 24 of the hitch-bar.

It is to be noted that the stabilizer chains 26 may be applied to the power lift without interfering with a conventional toggle-bar (not shown) which is often used in connection with the lift mechanism and is connected to a pin 48 of the conventional hydraulic control valve unit 50.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

The combination of a tractor frame having an upstanding transversely apertured lug at the rear end thereof, a power lift including a pair of rearwardly divergent draw bars pivoted at the front ends thereof to said frame at points spaced downwardly from said lug, a transversely extending hitch bar extending between and connected to the rear ends of said draw bars, and lift stabilizing means comprising a wire yoke including a transverse intermediate portion, a pair of convergent side portions, a pair of substantially U-shaped keeper seats provided at the junctions of said side portions with the ends of said intermediate portion, and a pair of spaced and coaxially apertured ears at the ends of said side portions, said ears straddling said lug, a pin extending through said lug and ears, and a pair of rearwardly and downwardly divergent chains connected at their rear ends to the opposite ends of said hitch bar, forward end portions of said chains having links individually and selectively engageable with the respective keeper seats of said yoke.

HILMER E. HANCOCK.

REFERENCES CITED

The following references are of record in the file of this patent:

UNITED STATES PATENTS

| Number | Name | Date |
|---|---|---|
| 2,341,007 | Wommer | Feb. 8, 1944 |
| 2,398,365 | Ellis | Apr. 16, 1946 |
| 2,566,547 | Bartlett | Sept. 4, 1951 |

FOREIGN PATENTS

| Number | Country | Date |
|---|---|---|
| 7,089 of 1895 | Great Britain | Mar. 28, 1896 |